United States Patent
Hidaka

(10) Patent No.: US 8,849,343 B2
(45) Date of Patent: Sep. 30, 2014

(54) WIRELESS COMMUNICATION TERMINAL AND CONTROL METHOD

(75) Inventor: Hiroyuki Hidaka, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 1322 days.

(21) Appl. No.: 12/026,393

(22) Filed: Feb. 5, 2008

(65) Prior Publication Data

US 2008/0139242 A1 Jun. 12, 2008

Related U.S. Application Data

(62) Division of application No. 10/538,165, filed as application No. PCT/JP03/15782 on Dec. 10, 2003, now abandoned.

(30) Foreign Application Priority Data

Dec. 10, 2002 (JP) ................. 2002-357976

(51) Int. Cl.
*H04M 1/00* (2006.01)
*H04W 88/06* (2009.01)
*G06F 1/00* (2006.01)

(52) U.S. Cl.
CPC ................... *H04W 88/06* (2013.01)
USPC .......... 455/552.1; 713/310; 455/436

(58) Field of Classification Search
CPC ..... H04W 36/14; H04W 36/30; H04W 48/18; H04W 52/0225; H04W 76/048; H04W 88/06
USPC ........ 455/436–444, 432.1–433, 343.5–343.6, 455/127.4–127.5, 127.1, 574, 552.1–553.1; 340/7.32; 713/320–324
See application file for complete search history.

(56) References Cited

U.S. PATENT DOCUMENTS

| | | | | |
|---|---|---|---|---|
| 6,408,395 | B1 * | 6/2002 | Sugahara et al. | 713/310 |
| 6,631,469 | B1 * | 10/2003 | Silvester | 713/2 |
| 6,961,583 | B2 * | 11/2005 | Moles et al. | 455/552.1 |
| 6,993,667 | B1 * | 1/2006 | Lo | 713/320 |
| 7,330,735 | B2 * | 2/2008 | Glazko et al. | 455/552.1 |
| 7,477,898 | B2 * | 1/2009 | Hidaka | 455/436 |
| 2002/0068586 | A1 * | 6/2002 | Chun et al. | 455/458 |
| 2002/0111169 | A1 * | 8/2002 | Vanghi | 455/436 |

FOREIGN PATENT DOCUMENTS

| | | |
|---|---|---|
| JP | 06-232805 | 8/1994 |
| JP | 09-172675 | 6/1997 |
| JP | 11-208666 | 8/1999 |
| JP | 11-243356 | 9/1999 |
| JP | 2000-201382 | 7/2000 |
| JP | 2001-036958 | 2/2001 |
| JP | 2001-224074 | 8/2001 |
| JP | 2002-531028 | 9/2002 |
| JP | 2002-534822 | 10/2002 |
| WO | WO 01/52567 A2 | 7/2001 |

* cited by examiner

*Primary Examiner* — Matthew Sams
(74) *Attorney, Agent, or Firm* — DLA Piper LLP (US)

(57) ABSTRACT

A wireless communication terminal, which performs wireless communication with base stations using each of a first communication method and a second communication method and enables to be in an idle state with both methods, having a setting section that sets a suspend time for detecting an incoming call from the base station using the first communication method subsequent to completion of communication with the base station using the first communication method; and a determination section that determines a cause of the completion of communication with the base station, wherein the setting section sets the suspend time based on the cause of completion of communication determined by the determination section.

6 Claims, 6 Drawing Sheets

WIRELESS COMMUNICATION TERMINAL AND CONTROL METHOD

CROSS-REFERENCE TO THE RELATED APPLICATIONS

This application is a divisional of application Ser. No. 10/538,165 filed Jun. 8, 2005, which is national stage of international application No. PCT/JP2003/15782 filed Dec. 10, 2003, which also claims benefit of priority under 35 U.S.C. §119 to Japanese Patent Application No. 2002-357976 filed Dec. 10, 2002, the entire contents of which are incorporated by reference.

TECHNICAL FIELD

The invention relates to a wireless communication terminal and a control method in connection with a hybrid-type wireless communication terminal which performs communication with switching between two communication systems.

BACKGROUND ART

A dual-type wireless communication terminal capable of performing communication with base stations with switching between two communication systems has been known.

Patent Document 1: JP-A-H9-172675

Out of the above dual-type wireless communication terminals, a wireless communication terminal, which can measure a wireless communication status of one communication method during communication using another communication method and monitor an incoming call, is especially called a hybrid type.

In relation to the hybrid-type wireless communication terminal, a hybrid-type wireless communication terminal using a cdma2000 1x system which is mainly designed for voice communication and a 1xEVDO system which is specifically designed for data communication monitors the status of radio wave of each system and an incoming call from the base station by means of switching an antenna and a radio section to each system at predetermined intervals.

The interval used for the system monitoring is specified by each system, and the wireless communication terminal controls timing in cooperation with the base station so as to prevent occurrence of an overlap between monitoring of the cdma2000 1x system and monitoring of the 1xEVDO system (see FIG. 2).

While system monitoring is performed under with one system, monitoring with another system cannot be performed because the antenna and the radio section are occupied.

Here, when the base station under monitoring has changed as a result of that idle handoff (handoff arising in an idle state) has arisen in the cdma2000 1x system by deterioration of the radio wave status, the timing of system monitoring may change.

In this case, the timing of monitoring the 1xEVDO system must be changed such that an overlap does not arise between the timings of monitoring the two systems.

At this time, since the 1xEVDO system carries out communication with the base station in order to change the monitoring timing, the antenna and the radio section are occupied by the 1xEVDO system.

Incidentally, in the 1xEVDO system, the wireless communication terminal awaits in a measurement status where an incoming signal output from the base station can be received during a certain period of time after completion of communication processing with the base station, in consideration of occurrence of disconnection due to instantaneous interruption of a radio wave during communication.

For this reason, the antenna and the radio section are occupied by the 1xEVDO system for a certain period of time after termination of communication.

Therefore, the cdma2000 1x system cannot detect an incoming call while the 1xEVDO system performs processing in order to change the timing of the system monitoring, as well as during a subsequent certain period of time.

Particularly, when the cdma2000 1x system is in an area where idle handoff arises frequently; i.e., where a conflict occurs between the signals output from a plurality of base stations, the idle handoff frequently arises after the processing for changing the timing of monitoring the 1xEVDO system after the idle handoff of the cdma2000 1x. Therefore, the incoming call arrival rate of the cdma2000 1x drops extremely.

DISCLOSURE OF INVENTION

The invention has been conceived in view of the previously-described drawbacks and aims at providing a wireless communication terminal which prevents deterioration of the incoming call arrival rate of the cdma2000 1x, as a hybrid terminal performing communication with base stations by means of switching between two systems; i.e., the cdma2000 1x system and the 1xEVDO system.

A first invention is characterized by a wireless communication terminal, which performs wireless communication with base stations using each of a first communication method and a second communication method and enables to be in an idle state with both methods, having: a setting section that sets a suspend time for detecting an incoming call from the base station using the first communication method subsequent to completion of communication with the base station using the first communication method; and a determination section that determines a cause of the completion of communication with the base station, wherein the setting section sets the suspend time based on the cause of completion of communication determined by the determination section.

A second invention according to the first invention is characterized in that the setting section does not set the suspend time except when the cause of the completion of communication is interruption of wireless communication.

A third invention is characterized by a wireless communication terminal, which performs wireless communication with base stations using each of a first communication method and a second communication method and enables to be in an idle state with both methods, having: a setting section that sets a suspend time for detecting an incoming call from the base station using the first communication method subsequent to completion of communication with the base station using the first communication method; a first changing section that changes a suspend timing of the second communication method; and a second changing section that changes a suspend timing of the first communication method by communicating with the base station when the first changing section changes the suspend timing of the second communication method, wherein the setting section does not set the suspend time in a case of communicating with the base station by the second changing section.

A fourth invention according to the first to third inventions is characterized in that the first communication method is a 1xEVDO system, and the second communication method is a cdma2000 1x system.

A fifth invention is characterized by a wireless communication terminal control method which performs wireless communication with base stations using each of a first communication method and a second communication method and enables to be in an idle state with both methods, the method including the steps of: determining a cause of completion of communication with the base station using the first communication method; and setting a suspend time for detecting an incoming call from the base station using the first communication method subsequent to the completion of communication with the base station using the first communication method, based on the determined cause of the completion of communication.

A sixth invention according to the fifth invention is characterized in that the suspend time is not set except when the cause of completion of communication is interruption of wireless communication.

A seventh invention is characterized by a wireless communication terminal control method which performs wireless communication with base stations using each of a first communication method and a second communication method and enables to be in an idle state with both methods, wherein when a suspend timing of the first communication method is changed by communicating with the base station based on a change of a suspend timing of the second communication method, a suspend time for detecting an incoming call from the base station using the first communication method subsequent to completion of communication with the base station is not set.

An eighth invention according to the fifth to seventh inventions is characterized in that the first communication method is a 1xEVDO system, and the second communication method is a cdma2000 1x system.

BEST MODE FOR CARRYING OUT THE INVENTION

An embodiment of the invention will be described hereinbelow.

Figure 1:
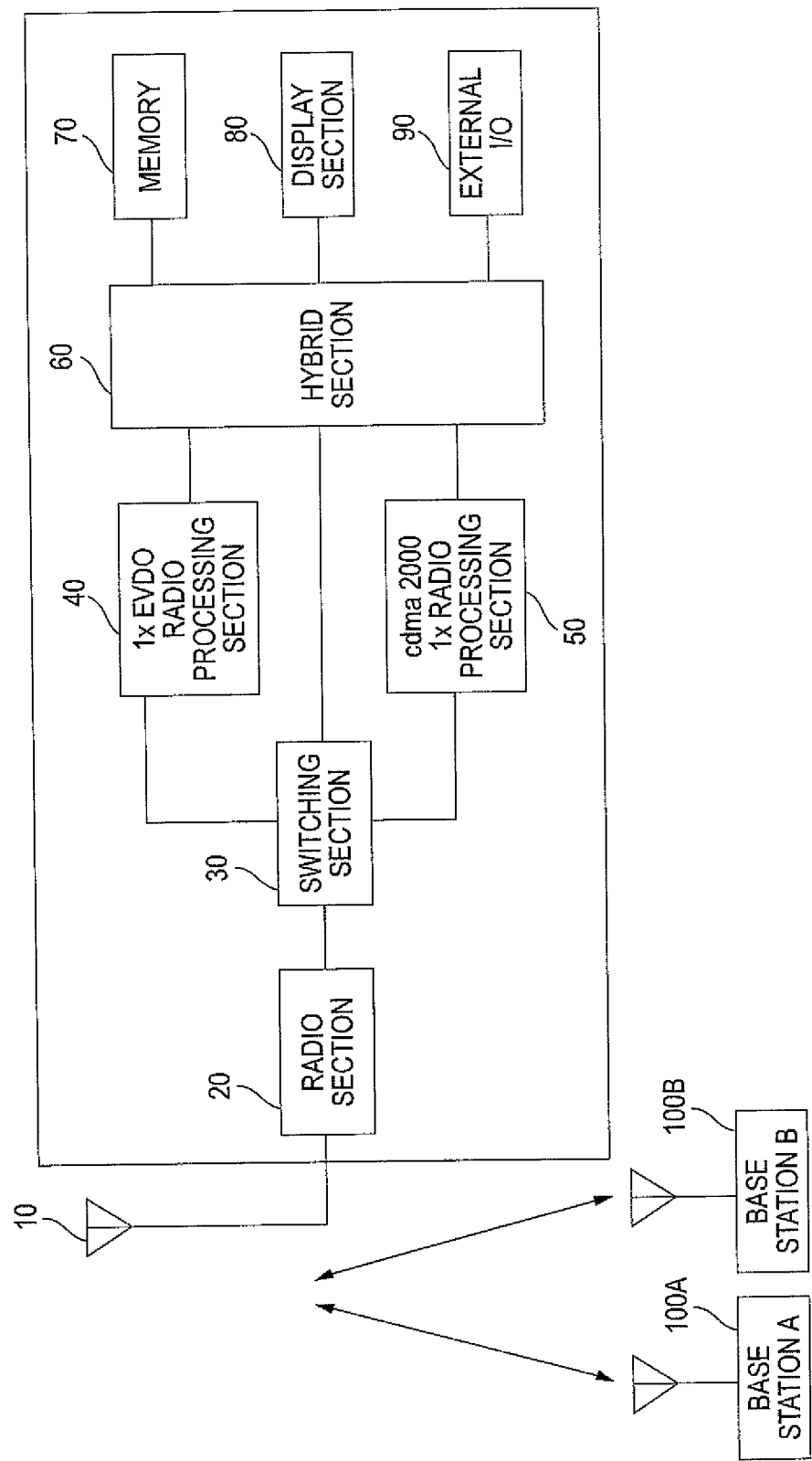
FIG. 1 is a block diagram of a wireless communication terminal according to an embodiment of the invention.

FIG. 1 is a block diagram showing the configuration of a wireless communication terminal according to an embodiment of the invention.

A wireless communication terminal of the embodiment is a wireless communication terminal which can perform communication while moving, by means of selectively switching between a communication system of cdma2000 1x method and a communication system of 1xEVDO (1x Evolution Data Only) method to perform handoff between a base station A (100A) and a base station (100B) in each system.

An antenna 10 converts a high-frequency signal received from a radio section 20 into a radio wave to transmit the radio wave to the base stations (100A), (100B), and receives radio waves output from the base stations (100A), (100B) to transmit the radio waves to the radio section 20 as high-frequency signals.

The radio section 20 converts the high-frequency signals transmitted from the antenna 10 into base band signals and sends the base band signals to radio processing sections 40, 50 through a switching section 30. Further, the radio section 20 converts base band signals transmitted from the radio processing sections 40, 50 through the switching section 3Q into high-frequency signals to send the high-frequency signals to the antenna 10.

The switching section 30 selectively transmits the base band signals output from the 1xEVDO radio processing section 40 or the cdma2000 1x radio processing section 50 to the radio section 20. Further, the switching section 30 selectively sends the base band signals output from the radio section 20 to the 1xEVDO radio processing section 40 or the cdma2000 1x radio processing section 50.

The 1xEVDO radio processing section 40 converts the data signals transmitted in 1xEVDO format into base band signals, and sends the base band signals to the radio section 20 through the switching section 30. Moreover, the 1xEVDO radio processing section 40 converts base band signals transmitted from the radio section 20 through the switching section 30 into data signals in 1xEVDO format.

Like the 1xEVDO radio processing section 40, the cdma2000 1x radio processing section 50 converts data or audio signals transmitted in cdma2000 1x format into base band signals to send the base band signals to the radio section 20 through the switching section 30.

Moreover, the cdma2000 1x radio processing section 50 converts base band signals transmitted from the radio section 20 through the switching section 30 into data or audio signals in cdma2000 1x format.

A hybrid section 60 is a control section for controlling the two communication systems by means of selectively switching between the two communication systems; that is, the 1xEVDO system and the cdma200 1x system. The hybrid section 60 is connected to the switching section 30, the 1xEVDO radio processing section 40, and the cdma2000 1x radio processing section 50, thereby controlling switching thereof.

Particularly, the two communication systems are selectively switched at predetermined time intervals during an idle state, and the wireless communication terminal await incoming calls in both communication systems.

The hybrid section 60 is connected to a memory 70, a display section 80, and an external I/O 90.

The memory 70 is a storage section which enables writing or reading of communication data, a program for controlling the wireless communication terminal, or the like.

The display section 80 is a display section which is mainly configured from an LCD display or the like and displays the status of the wireless communication terminal and communication data.

The external I/O 90 is an interface which connects the wireless communication terminal to an external equipment such as a personal computer or a PDA, thereby enabling to transmit and receive various data.

Operation of the wireless communication terminal of the present embodiment having the foregoing configuration will be described as follows.

The cdma2000 1x system and the 1xEVDO system monitors operation at given intervals in order to measure the status of a radio wave and monitor an incoming call.

The interval is 5.12 seconds, for example.

The wireless communication terminal cannot simultaneously communicate using the two systems. Therefore, the antenna 10 and the radio section 20 are switched so that each system can be monitored at intervals of 5.12 seconds.

Figure 2:
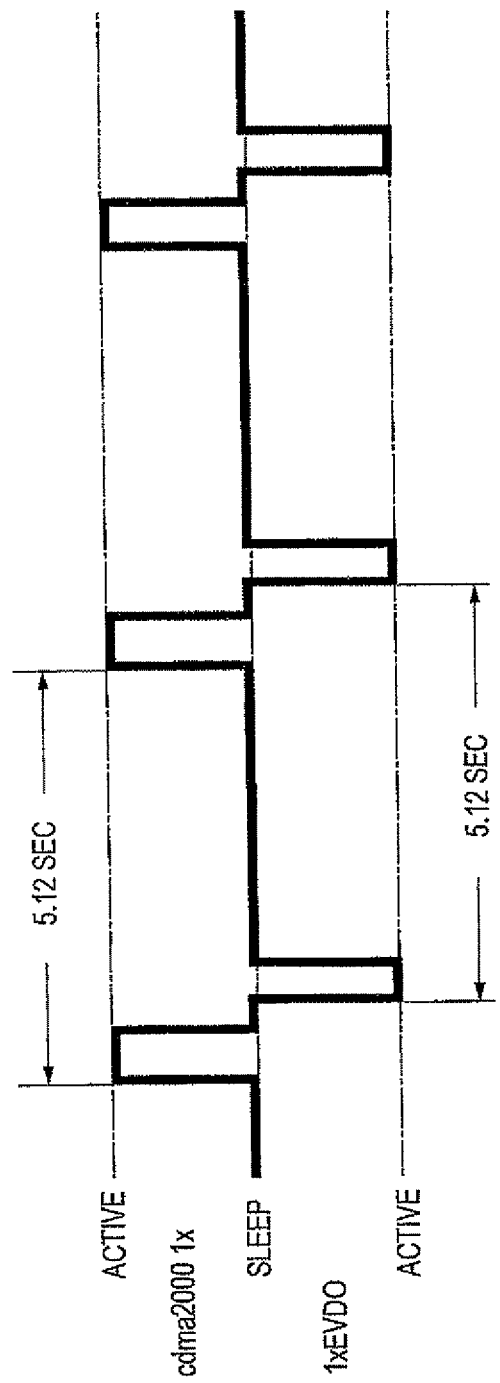
FIG. 2 is a timing chart showing a conventional incoming call monitoring timing.

FIG. 2 is a timing chart of the monitoring timing.

First, the antenna 10 and the radio section 20 are switched to the cdma2000 1x when the timing for monitoring of the cdma2000 1x system has come, and the wireless communication terminal shifts to a system monitoring state (Active), thereby monitoring the status of a radio wave of the base station and an incoming call.

After completion of the processing for monitoring of the cdma2000 1x system, the antenna 10 and the radio section 20 are released, and the cdma2000 1x system shifts to a hibernation (Sleep).

Subsequently, the antenna 10 and the radio section 20 are switched to the 1xEVDO when the timing for monitoring of the 1xEVDO system has come, and the wireless communication terminal shifts to a system monitoring state (Active), thereby monitoring the status of a radio wave of the base station and an incoming call.

After completion of the processing for monitoring of the 1xEVDO system, the antenna 10 and the radio section 20 are released, and the 1xEVDO system shifts to the Sleep state.

The 1xEVDO system has workings of capable of immediately resuming communication when communication is interrupted according to the state of the radio wave.

This means that, when the wireless communication terminal detects an interruption of a radio wave according to the status of the radio wave, the wireless communication terminal transmits a communication disconnection message (Connection Close Message) to the base station and stands in a consecutive receiving state for a subsequent given period of time so as to be able to receive an incoming message (Page Message) instructing the base station to make re-connection. This consecutive suspend time subsequent to interruption of communication is called a guard time (Suspend Time). After lapse of the given period of time, the wireless communication terminal shifts to the Sleep state for saving power and monitors the system at given intervals.

When the wireless communication terminal has successfully received an incoming message from the base station during the suspend time, the wireless communication terminal can immediately resume communication. Once the wireless communication terminal shifted to the Sleep state, it takes long time to reconnect because the wireless communication terminal monitors the system at the given period of time.

Figure 3A:
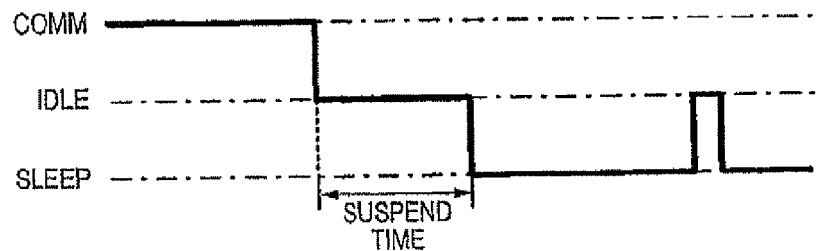
FIGS. 3A and 3B are timing charts showing processing performed in the 1xEVDO system during a conventional suspend time.
Figure 3B:
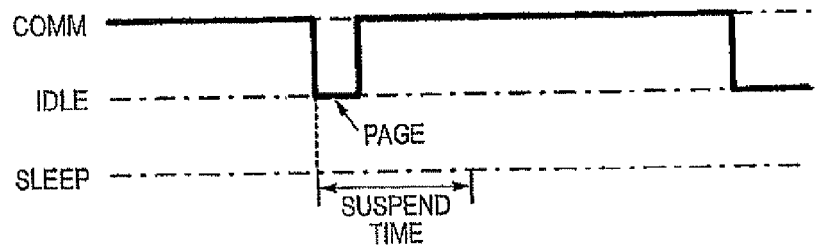
Figure 3C:
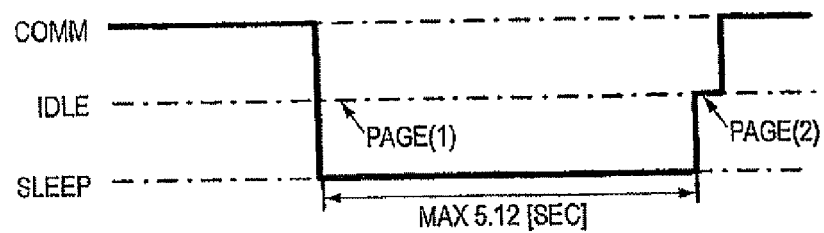

FIGS. 3A and 3B show timing charts of communication using the suspend time in the 1xEVDO system.

When communication with the base station is lost by abrupt interruption of a radio wave or the like under a state where 1xEVDO performs data communication (Comm), the Connection Close Message is sent to the base station.

Subsequently, the wireless communication terminal shifts to the consecutive receiving state (Idle) where the wireless communication terminal receives a signal from the base station. After lapse of the suspend time, the wireless communication, terminal shifts to the Sleep state (FIG. 3A).

FIG. 3B is a timing chart followed when an incoming message output from the base station is received during a period from when interruption of communication is detected until lapse of the suspend time after transmission of the Connection Close Message.

When the state of a radio wave has been restored before lapse of the suspend time, the wireless communication terminal can immediately receive an incoming message from the base station because the 1xEVDO is performing consecutive receiving operation in the Idle state. Thus, the wireless communication terminal can resume data communication.

If the wireless communication terminal has immediately shifted to the Sleep state just after the wireless communication terminal detects interruption of communication and sends the Connection Close Message, the wireless communication terminal cannot receive an incoming message even when the base station has sent an incoming message (Page (1)) immediately. When the wireless communication terminal performs the processing for monitoring an incoming call after lapse of 5.12 seconds, the wireless communication terminal receives an incoming, message (Page (2)) transmitted from the base station.

Specifically, when the suspend time is not set, a throughput of data communication is deteriorated when the state of the radio wave is not good.

Reconnection workings with using the suspend time is effective for a wireless communication terminal using a single 1xEVDO system. However, it raises the following problem in a hybrid terminal using cdma2000 1x and 1xEVDO.

Specifically, when idle handoff (i.e., handoff in an idle state) has arisen in the cdma2000 1x system for reasons of the status of a radio wave, which in turn causes a change of base station, thereby the monitoring timing changes, the cdma2000 1x system updates the monitoring timing.

At this time, in order to prevent an overlap between the monitoring timing of the cdma200 1x system and that of the 1xEVDO system, the wireless communication terminal performs reconfiguration of the system monitoring timing in the 1xEVDO system too.

The wireless communication terminal switches to the 1xEVDO system immediately after completion of the idle handoff of the cdma2000 1x system in order to perform the reconfiguration operation.

In the 1xEVDO system, the wireless communication terminal starts communication with the base station in order to perform the reconfiguration operation.

Subsequently, the reconfiguration is completed, and the communication with the base station is then disconnected. However, because of presence of the previously-described suspend time, the 1xEVDO system cannot be released for the period of suspend time after disconnection of communication.

For this reason, even when an incoming call has arrived at the cdma2000 1x system during that period, the incoming call cannot be detected because the antenna and the radio section are being switched to the 1xEVDO.

Particularly, when the cdma2000 1x system is in the vicinity of a border between base stations and is in an area where idle handoff involving a change of monitoring timing is repeated, the period of time during which the 1xEVDO system occupies the antenna 10 and the radio section 20 becomes longer for reasons of a change of the monitoring timing of the 1xEVDO system after idle handoff of the cdma2000 1x. Therefore, the incoming call arrival rate of the cdma2000 1x system drops extremely.

Figure 4:
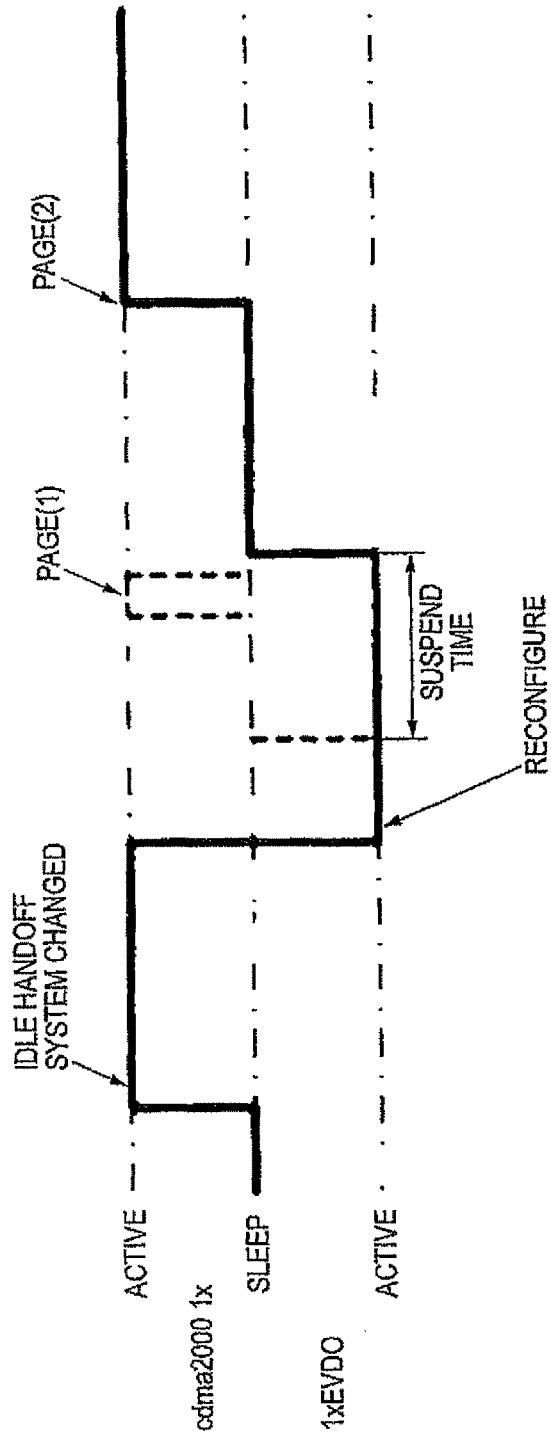
FIG. 4 is a conventional timing chart followed when idle handoff has arisen in the cdma2000 1x system.

FIG. 4 shows a conventional timing chart for a case where idle handoff has arisen in the cdma2000 1x system.

The cdma2000 1x system detects idle handoff in accordance with the status of a radio wave of the base station or the like, and performs idle handoff processing.

At this time, when the incoming call monitoring timing of the cdma2000 1x system has been changed, the 1xEVDO system is brought into an Active state immediately after completion of idle handoff processing of the cdma2000 1x, thereby performing reconfiguration in conjunction with the base station.

When the reconfiguration processing has been completed, the 1xEVDO system transmits the Connection Close Message to the base station. However, since the suspend time is set in the 1xEVDO system as mentioned previously, the 1xEVDO system remains in the Active state until the end of the suspend time, thus holding an idle state.

Therefore, even when the base station has sent an incoming message (Page (1)) to the cdma2000 1x system, the wireless communication terminal in the service area of the cdma2000 1x system cannot detect an incoming call. The wireless communication terminal can detect an incoming message (Page (2)) for the first time at the incoming call monitoring timing after the 1xEVDO has shifted to the Sleep state.

The wireless communication terminal of the present embodiment of the invention is configured such that, in order to solve the problem, the suspend time of the 1xEVDO system is set as the related art in the event of unexpected termination of communication such as instantaneous interruption of a radio wave during data communication of the 1xEVDO system; and such that the suspend time is not set when the processing for communication with the base station has ended properly.

Figure 5:
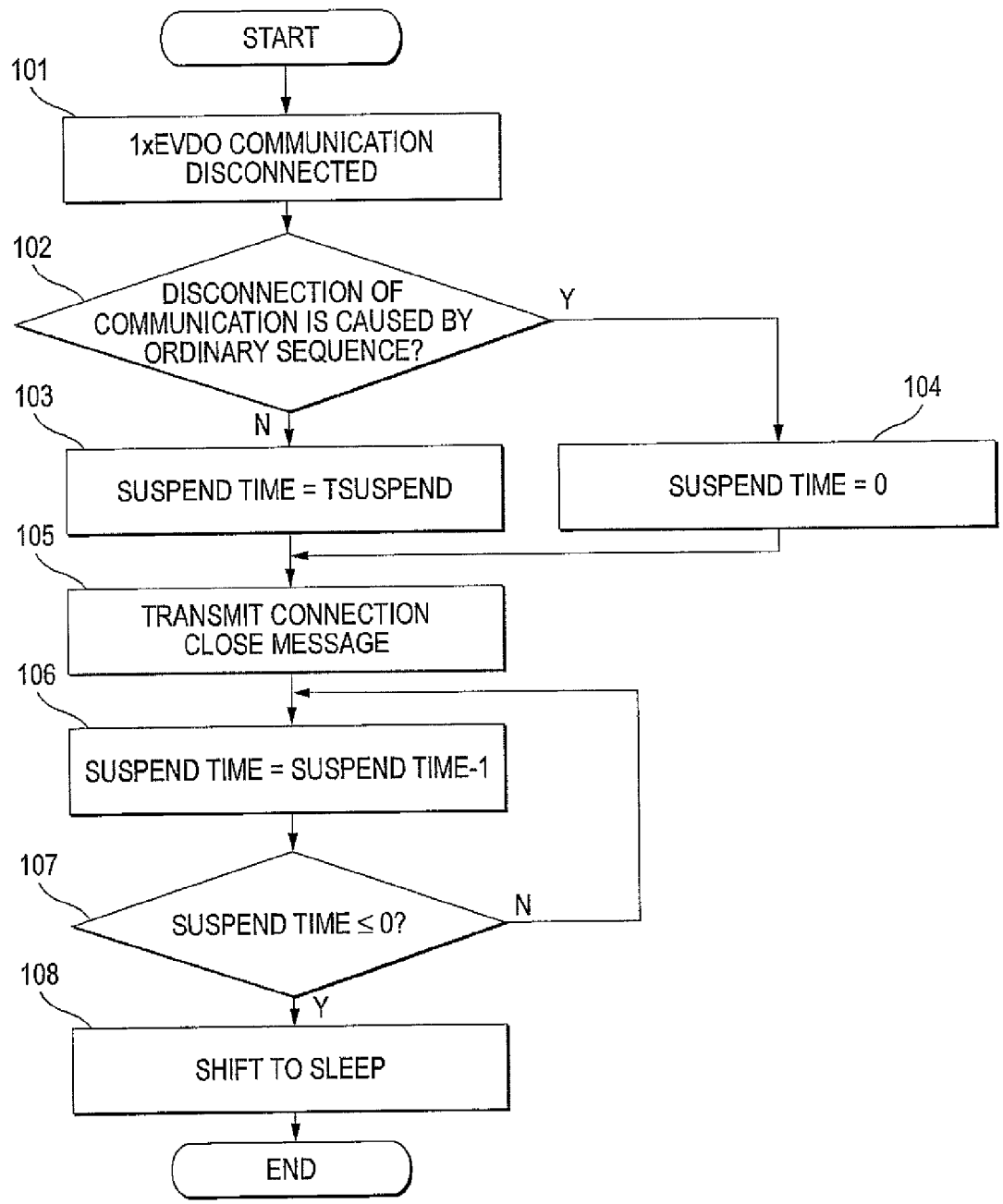
FIG. 5 is a flowchart showing the flow of processing of a wireless communications terminal according to the embodiment of the invention.

FIG. 5 is a sequence showing the flow of processing performed when the 1xEVDO system in the wireless communication terminal of the embodiment performs communication.

First, when communication of the 1xEVDO is interrupted (step 101), it is determined whether or not the interruption is caused by normal sequence processing (step 102).

When the disconnection processing of the wireless communication terminal corresponds to completion of ordinary processing performed along the sequence, the suspend time is set to SuspendTime=0 so that the wireless communication terminal can shift to the Sleep state immediately after completion of the disconnection processing, to thus prevent setting of the suspend time (step 104).

On the other hand, when the disconnection processing does not correspond to ordinary completion such as unexpected disconnection of communication due to instantaneous interruption of a radio wave or the like, the suspend time is set to SuspendTime=Tsuspend so that the wireless communication terminal shifts to the Sleep state after completion of the disconnection processing (step 103).

Next, the wireless communication terminal transmits the Connection Close Message (Connection Close) to the base station, thereby informing the base station of occurrence of disconnection of communication (step 105).

Next, in steps 106 and 107, processing for counting the suspend time (a countdown) is performed.

After completion of the countdown, the wireless communication terminal shifts to the Sleep status (step 108), and the processing is completed.

According to the above processing, settings of the suspend time can be changed in accordance with the type of a cause of disconnection of communication of the 1xEVDO system.

Figure 6:
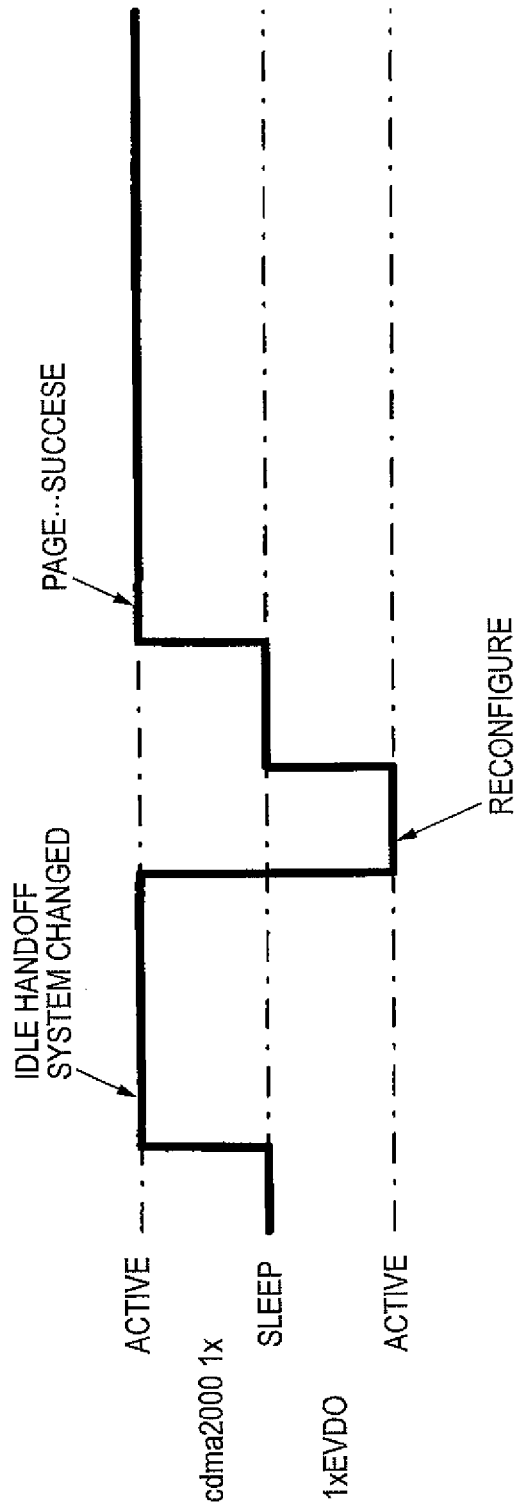
FIG. 6 is a timing chart pertaining to the embodiment of the invention when idle handoff has arisen in the cdma2000 1x system.

FIG. 6 is a timing chart for a case where idle handoff has arisen in the cdma2000 1x system under the situation of no suspend time being set (Suspend Time=0).

When the cdma2000 1x system performs idle handoff processing, thereby the timing of monitoring an incoming call is changed, the 1xEVDO system is brought into the Active state in order to change the timing of monitoring an incoming call with the 1xEVDO and performs reconfiguration operation in conjunction with the base station.

When the connection is disconnected as a result of proper completion of the reconfiguration operation, the communication is determined to have been completed due to the normal sequence in step 102 shown in FIG. 5. Therefore, the suspend time is set to 0. As a result, the 1xEVDO system can shift to the Sleep state immediately after completion of reconfiguration operation.

Consequently, when an incoming call message is detected at the timing at which the cdma2000 1x system monitors an incoming call after completion of the reconfiguration operation, communication can be immediately performed.

The wireless communication terminal of the embodiment having the foregoing configuration requires a change of the monitoring timing of the 1xEVDO for reasons of idle handoff of the cdma2000 1x system. When the processing of communication with the 1xEVDO base station has completed properly, such as a case where reconfiguration of the monitoring timing has been performed, the suspend time of the 1xEVDO system is not set.

Therefore, the time during which the 1xEVDO occupies the system becomes shorter. Even when idle handoff frequently arises in the cdma2000 1x system, a drop in the incoming call arrival rate of the cdma2000 1x can be improved.

In the present embodiment, it is determined, as setting condition of the suspend time, whether disconnection of communication of the 1xEVDO is by interruption of a radio wave or the others (disconnection of communication due to an ordinary sequence). In another example, it may be determined on the basis of completion of reconfiguration of the incoming call monitoring timing or an end instruction made by the user.

The invention has been described in detail by reference to a specific embodiment. However, it is obvious to the person skilled in the art to make various modifications or corrections on the invention without departing from the sprint and scope of the invention.

The present patent application is based on Japanese Patent Application (Patent Application No. 2002-357976) filed on Dec. 10, 2002, and descriptions of the application are incorporated herein by reference.

INDUSTRIAL APPLICABILITY

The invention has a determination section that determines a cause of the completion of communication with a base station, and a suspend status setting section that determines whether or not a suspend time for continuously awaiting an incoming call from the base station is set. Therefore, the suspend time can be appropriately set according to a cause of completion of communication with the base station. As a result, the throughput of data communication can be enhanced and a drop in call rate can be improved.

Particularly, the suspend time is not set when completion is caused by proper processing procedures. Therefore, the incoming call arrival rate can be enhanced. When the cause of the completion is unexpected, the suspend time is set. Accordingly, the throughput of data communication can be enhanced.

The invention claimed is:

1. A wireless communication terminal, which performs wireless communication with base stations using each of a first communication method and a second communication method and enables to be in an idle state with both methods, comprising:

a setting section embodied on a microprocessor and configured for setting a suspend time for detecting an incoming call from the base station using the first communication method subsequent to completion of communication with the base station using the first communication method; and a determination section embodied on a microprocessor and configured for determining a cause of the completion of communication with the base station, wherein the setting section sets a time as the suspend time based on the cause of completion of communication determined by the determination section, and the setting section sets the suspend time for zero except when the cause of the completion of communication is interruption of wireless communication.

2. The wireless communication terminal according to claim 1, wherein the setting section does not set the suspend time except when the cause of the completion of communication is interruption of wireless communication.

3. The wireless communication terminal according to claim 1 or 2, wherein the first communication method is a 1xEVDO system, and the second communication method is a cdma2000 1x system.

4. A wireless communication terminal control method embodied on a non-transitory computer-readable medium and executed on a microprocessor which performs wireless communication with base stations using each of a first communication method and a second communication method and enables to be in an idle state with both methods, the method comprising the steps of:

determining a cause of completion of communication with the base station using the first communication method; and setting a time as a suspend time for detecting an incoming call from the base station using the first communication method subsequent to the completion of communication with the base station using the first communication method, based on the determined cause of the completion of communication, wherein the suspend time is set for zero except when the cause of the completion of communication is interruption of wireless communication.

5. The wireless communication terminal control method according to claim 4, wherein the suspend time is not set except when the cause of completion of communication is interruption of wireless communication.

6. The wireless communication terminal control method according to claim 4 or 5, wherein the first communication method is a 1xEVDO system, and the second communication method is a cdma2000 1x system.

\* \* \* \* \*